United States Patent
Schmidt

(10) Patent No.: US 7,241,242 B2
(45) Date of Patent: Jul. 10, 2007

(54) TWO-MODE COMPOUND-SPLIT HYDRAULIC CONTINUOUSLY VARIABLE TRANSMISSION

(75) Inventor: Michael R. Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 201 days.

(21) Appl. No.: 10/976,053

(22) Filed: Oct. 28, 2004

(65) Prior Publication Data

US 2006/0094554 A1  May 4, 2006

(51) Int. Cl.
*F16H 47/04* (2006.01)
*F16H 37/06* (2006.01)

(52) U.S. Cl. .......................... 475/72; 475/330

(58) Field of Classification Search .............. 475/72, 475/73, 75, 80, 83, 329, 330, 343
See application file for complete search history.

(56) References Cited

U.S. PATENT DOCUMENTS

| | | | | |
|---|---|---|---|---|
| 3,888,139 A | * | 6/1975 | Orshansky, Jr. | 475/75 |
| 3,897,697 A | * | 8/1975 | Chambers et al. | 475/80 |
| 5,052,986 A | * | 10/1991 | Jarchow et al. | 475/76 |
| 5,466,197 A | * | 11/1995 | Mitsuya et al. | 475/72 |
| 6,042,496 A | * | 3/2000 | Lehle et al. | 475/81 |
| 2005/0059521 A1 | * | 3/2005 | Funato et al. | 475/73 |

* cited by examiner

*Primary Examiner*—Roger Pang
(74) *Attorney, Agent, or Firm*—Dan L. Thompson

(57) ABSTRACT

A two-mode compound-split hydro-mechanical powertrain employs a hydro-mechanical continuously variable transmission having two hydraulic units, at least two torque-transmitting mechanisms, and a planetary gear arrangement for combining the output of an engine and the two hydraulic units into a single output mechanism.

3 Claims, 2 Drawing Sheets

TWO-MODE COMPOUND-SPLIT HYDRAULIC CONTINUOUSLY VARIABLE TRANSMISSION

TECHNICAL FIELD

This invention relates to continuously variable transmissions and, more particularly, to continuously variable transmissions employing hydraulic power mechanisms.

BACKGROUND OF THE INVENTION

Power transmissions are employed in vehicle powertrains to provide a plurality of ratio changes between the engine and a transmission output generally comprised of a differential mechanism. The transmission takes many different forms. The earliest of the transmissions were generally countershaft-type transmissions for use in passenger vehicles, which gave way partially to automatically shifted planetary-type transmissions and to some continuously variable transmissions, particularly belt and pulley mechanisms, as well as electrical and hydraulic mechanisms.

There is a desire to reduce the overall size of the transmission in order to save real estate under the hood or in the rear of the vehicle where the transmission and/or the engine are located. In front wheel drive transverse powertrain applications, the linear distance or dimension of the powertrain is of importance.

SUMMARY OF THE INVENTION

It is an object of the present invention to provide a vehicle powertrain having an improved hydro-mechanical continuously variable power transmission.

In one aspect of the present invention, the hydro-mechanical transmission has a two mode compound-split operation.

In another aspect of the present invention, the hydro-mechanical transmission employs two interconnected planetary gearsets, which are operatively connected between an engine and a transmission output.

In yet another aspect of the present invention, one of the planetary gearset is drivingly connected with two hydraulic units, which operate as either pumps or motors.

In still another aspect of the present invention, the hydraulic units are disposed radially outward surrounding a portion of the planetary gearsets.

In yet still another aspect of the present invention, the transmission incorporates three selectively operable torque-transmitting mechanisms to provide range control within the planetary gearsets.

In a further aspect of the present invention, one of the torque-transmitting mechanisms is provided to establish a first range of operation, the second of the torque-transmitting mechanisms is provided to establish a second range of operation, and a combination of the second and the third of the torque-transmitting mechanisms establishes a cruise range, which is utilized for economical operation at high speed highway driving.

DESCRIPTION OF AN EXEMPLARY EMBODIMENT

Figure 1:
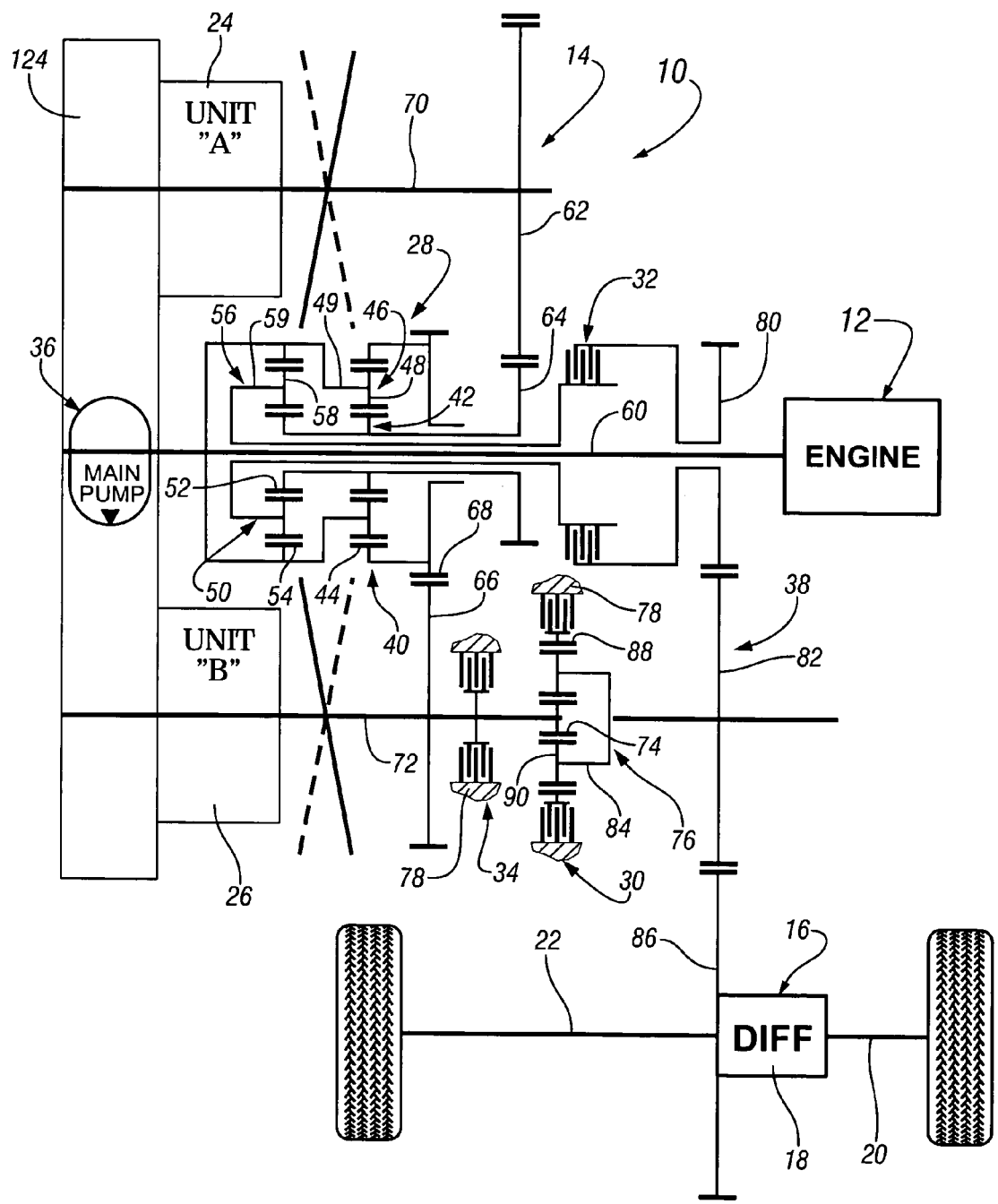
FIG. 1 is a schematic representation of a powertrain incorporating the present invention.

A powertrain 10, shown in FIG. 1, includes a conventional internal combustion engine 12, a power transmission 14, and a conventional output mechanism 16, which includes a differential mechanism 18, and output shafts 20 and 22.

The power transmission 14 includes two hydraulic power units 24 and 26, a planetary gear arrangement 28, three selectively engageable conventional torque-transmitting mechanisms 30, 32, and 34, a hydraulic control pump 36, and an output gear train 38. The planetary arrangement 28 includes a first planetary gearset 40 having a sun gear member 42, a ring gear member 44, a planet carrier assembly member 46, which includes a plurality of pinion gears 48 rotatably supported on a planet carrier member 49 and meshing with the sun gear member 42 and the ring gear member 44.

A second planetary gearset 50 includes a sun gear member 52, a ring gear member 54, a planet carrier assembly member 56, which includes a plurality of pinion gears 58 rotatably mounted on a planet carrier member 59 and disposed in meshing relationship with both the sun gear member 52 and the ring gear member 54.

An input shaft 60 is drivingly continuously connected between the engine 12, the hydraulic control pump 36, the ring gear member 54, and the planet carrier member 49. The control pump 36 is a conventional control hydraulic mechanism well known in the art.

The hydraulic units 24 and 26 are conventional variable displacement hydraulic units, which may be of the piston type, the vane type, or ball type units. The displacement of these units is variable in both a positive and negative direction in terms of which way the fluid is pumped and/or received. The controls for these mechanisms are well known in the art and may be hydraulic controls, hydro-mechanical controls, or electro-hydro-mechanical controls.

The sun gears 52 and 42 are continuously interconnected and are also drivingly connected with the hydraulic unit 24 through drive gears 62 and 64. The ring gear member 44 is continuously drivingly connected with the hydraulic unit 26 through drive gears 66 and 68. The hydraulic unit 24 has an output shaft 70, which is drivingly connected with the gear 62. The hydraulic unit 26 has an output shaft 72, which is drivingly connected with a sun gear member 74 of a planetary gearset 76. The output shaft 72 is also operatively connected with the torque-transmitting mechanism 34, which has one side thereof connected to a stationary portion 78 of the transmission 14 and therefore operates as a brake.

The planet carrier member 59 is operatively connected with the torque-transmitting mechanism 32, which has the other side thereof drivingly connected with an output gear 80, which is a member of the gear train 38. The torque-transmitting mechanism 32 operates as a clutch. The output gear train 38 includes the gear 80, a gear 82, which is drivingly connected through a planet carrier 84 at the planetary gearset 76, and a final drive gear 86, which is a portion of the output mechanism 16. The planetary gearset 76 also includes a ring gear member 88 and a plurality of pinion gears 90 that are rotatably mounted on the planet carrier 84 and continuously meshing with the sun gear member 74 and the ring gear member 88. The ring gear member 88 is selectively connectible with the stationary portion 78 through the torque-transmitting mechanism 30, which operates as a conventional brake mechanism.

The hydraulic units 24 and 26, as previously mentioned, can operate as either pumps or motors and can have either a positive or negative displacement. By controlling the displacement of the hydraulic units, the direction of rotation can be changed when operating as a motor and the direction of fluid being pumped can be changed when operating as a pump. The selective engagement of the torque-transmitting mechanisms 30 and 32 provide two modes of operation between the engine 12 and the output gear train 38.

The first mode of operation is provided by the torque-transmitting mechanism 30, which maintains the ring gear member 88 stationary and provides a reduction drive between the hydraulic unit 26 and the output gear 82. During the first mode of operation, the transmission can provide either forward or reverse drive, as seen in FIG. 2.

Figure 2:
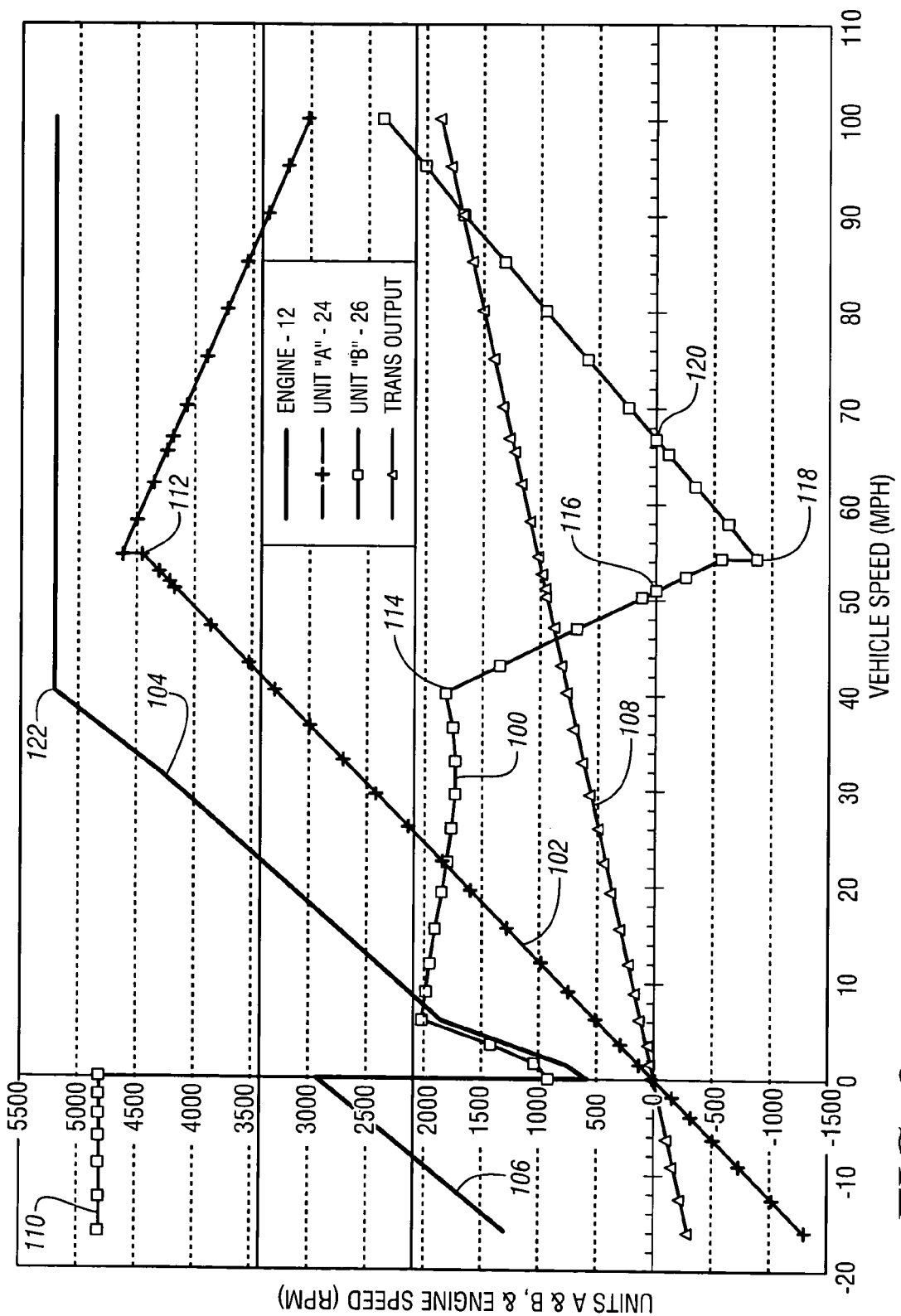
FIG. 2 is a set of curves describing the speed of units within the powertrain versus the overall speed of the vehicle.

In FIG. 2, it can be seen that the hydraulic unit 24 operates along the line 100, the hydraulic unit 26 operates along the line 102, the engine operates along the line 104 in forward operation, and operating along line 106 in reverse operation, and the transmission output speed is represented by line 108. It can be seen that the speed of the unit 26 and the transmission output speed pass through a zero point, which is the origin of the curve. When operating in reverse, the unit 24 operates as a pump and has a constant speed as represented by the line 110. The speed of the hydraulic unit 26 can operate at an increase in speed to provide an increase in speed in reverse.

During the reverse operation, the unit 24 is operating as a pump and the displacement is changed from essentially zero to a negative value and the unit 26 operates as a motor and is maintained at a substantially constant displacement through the reverse range of operation.

In the first range of forward operation, again the torque-transmitting mechanism 30 is engaged and the speed of the unit 26 is increased along the line 102. During this range of operation between the origin and the point 112, the unit 26 operates as a motor to point 116 and then as a pump. The unit 26 has a one-sixth displacement setting for a portion of the speed range and then a decrease in displacement, which eventually passes through a zero point and to a negative displacement by the time the point 112 is achieved.

The displacement of unit 24, which is operating as a pump, increases from the zero speed point as does the speed of the unit along the line 100 and the speed then undergoes a slight decrease while the displacement of the unit continues to increase until point 114 is reached. Between point 114 and point 116, the displacement of the hydraulic unit 24 is constant and under full power conditions is set at a maximum while the speed of the unit is decreased to a zero point. At the zero point of speed 116, the unit 24 begins to operate as a motor between the point 116 and point 118. Between the point 118 and another zero speed point 120, the unit 24 operates as a pump. Also during the time the unit 24 is operating as a pump, unit 26 operates as a motor.

From the point 112 until a point aligned with the zero speed point 120, the hydraulic unit 26 is operating as a motor and has a negative displacement, which decreases to the zero displacement point. At the zero speed point, points 116 and 118, the displacement of the hydraulic unit 26 is essentially zero and therefore operates as a stationary reaction within the system and the displacement of the unit 26 is at a maximum. Between the zero speed point 120 and the maximum speed of the vehicle, the hydraulic unit 24 acts as a motor and the hydraulic unit 26 acts as a pump. The displacement of the hydraulic unit 24 remains constant between these two points and the displacement of the unit 26 is continuously increased to provide a speed increase for the vehicle. As can be noticed, when the engine reaches the point 122, the speed remains constant, such that any ratio or speed change for the vehicle following the point 122 is occasioned with the changes of displacement of the units 24 and 26.

At the point 118 on the curves, the torque-transmitting mechanism 30 is disengaged and the torque-transmitting mechanism 32 is engaged. When the torque-transmitting mechanism 32 is engaged, the second range or the high range of operation is occasioned. During this range of operation, the output of unit 26 when operating as motor and the input when operating as a pump is driven through the planetary gearset 40 by way of the ring gear member 44 and the gears 66 and 68. Also during this range of operation, the output of the hydraulic unit 24 as a motor or input as a pump, is taken through the gears 64 and 62, which are drivingly associated with the sun gear members 42 and 52.

The hydraulic units 24 and 26 are interconnected by a hydraulic channel 124, such that the fluid can flow freely back and forth between these units.

During the lower first range of operation, the hydraulic unit 26 is operating as a motor and provides power to the output mechanism 16 through the planetary gearset 76 by way of the sun gear member 74 and planet carrier member 84. Also during this phase of operation, the hydraulic unit 24 is operating as a pump, which receives power from the engine 12 through the planetary gear arrangement 28. It will be noted that the planetary gear arrangement 28 also provides power from the engine 12 to the output mechanism 16 through the drive gears 66 and 68 and the ring gear member 44. Thus, the power of the engine is split by the planetary gear arrangement 28 to provide power to the unit 24 as a pump and also power to the output. It will also be noted that the input shaft 60 is directly connected with the control pump 36 and therefore hydraulic control fluid is provided for the hydraulic mechanisms within the powertrain whenever the engine is operating.

During the second range of operation, the hydraulic unit 26 operates as a pump for a major portion of this range from the yield point 120 to the maximum speed point of the vehicle. During this range of operation, the engine power is divided by the planetary gear arrangement 28 between driving the hydraulic unit 24 as a pump during the first portion of the range, and driving the hydraulic unit 26 as a pump during the second portion of the range. During the first portion of the range when the hydraulic unit 24 is a pump, the hydraulic unit 26 is a motor and contributes power to the output of the powertrain through the gears 66 and 68 as well as the planetary gear arrangement 28. The hydraulic unit 24 accepts power from the pump through the planetary gear arrangement 28 during the first portion of the range and delivers power to the output through the planetary gear arrangement 28 during the second portion of the range, as explained above from the zero point 120 to the end of the speed curve.

During a cruise operation, the torque-transmitting mechanisms 34 and 32 are engaged simultaneously. Under this arrangement, the vehicle speed is adjusted only by the speed of the engine and the power is transferred mechanically and therefore provides the most efficient mode of operation. This condition would be occasioned during substantially constant speed operation under highway driving conditions.

The invention claimed is:

1. A two-mode compound-split powertrain having a hydraulically continuously variable transmission comprising:
an engine;
an input shaft continuously driven by said engine;
an output drive mechanism;

a first hydraulic unit and a second hydraulic unit, wherein neither of said first hydraulic unit or said second hydraulic unit is directly connected to said input shaft or said output drive mechanism to provide the compound-split configuration;

a planetary gear arrangement having a first planetary gearset having three rotatable members;

a second planetary gearset having three rotatable members;

a first selectively engageable torque-transmitting mechanism engageable to establish both a forward and a reverse operation in said continuously variable transmission; and a second selectively engageable torque-transmitting mechanism;

said first members of said planetary gearsets are continuously interconnected and drivingly connected with said first hydraulic unit, said second rotatable members of the planetary gearsets are drivingly interconnected and continuously drivingly connected with said input shaft, said third member of said first planetary gearset is continuously drivingly connected with said second hydraulic unit, and said third member of said second planetary gearset is selectively connectible with said transmission output mechanism through said second selectively engageable torque-transmitting mechanism wherein said transmission has a first zero speed point at which said first hydraulic unit does not rotate and a second zero speed point at which said second hydraulic unit does not rotate, and wherein at least one of said first hydraulic unit and said second hydraulic unit is selectively connectable to a stationary portion of said transmission for establishing one of said zero speed points.

2. The powertrain defined in claim 1, further wherein:

a third planetary gearset has a first member continuously drivingly connected with said second hydraulic unit;

a second rotatable member is continuously rotatably connected with said output mechanism;

a third rotatable member selectively connectible with said stationary portion of said transmission through said first torque-transmitting mechanism; and a third torque transmitting mechanism selectively connecting said second hydraulic unit and said stationary member of said transmission.

3. The powertrain defined in claim 2 further wherein:

only said first torque-transmitting mechanism is selectively engaged to provide a first range of powertrain operation in both a forward and reverse direction of operation; and only said second torque-transmitting mechanism is selectively engaged to provide a second range of powertrain operation.

* * * * *